US009952461B2

(12) United States Patent
Nakazawa et al.

(10) Patent No.: US 9,952,461 B2
(45) Date of Patent: Apr. 24, 2018

(54) DISPLAY DEVICE (71) Applicant: Nippon Seiki Co., Ltd., Niigata (JP)

(72) Inventors: Masahiko Nakazawa, Niigata (JP); Yusuke Yamashita, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/112,362

(22) PCT Filed: Jan. 19, 2015

(86) PCT No.: PCT/JP2015/051178
§ 371 (c)(1),
(2) Date: Jul. 18, 2016

(87) PCT Pub. No.: WO2015/118928
PCT Pub. Date: Aug. 13, 2015

(65) Prior Publication Data
US 2016/0334665 A1 Nov. 17, 2016

(30) Foreign Application Priority Data

Feb. 6, 2014 (JP) .................................. 2014-021506

(51) Int. Cl.
*G02F 1/1333* (2006.01)

(52) U.S. Cl.
CPC ...... *G02F 1/133308* (2013.01); *G02F 1/1333* (2013.01); *G02F 2001/13332* (2013.01);
(Continued)

(58) Field of Classification Search
CPC .. G09F 9/00; G02F 2202/28; G02F 1/133308; G02F 1/1333; G02F 1/133305;
(Continued)

(56) References Cited

U.S. PATENT DOCUMENTS

2009/0078879 A1* 3/2009 Miyako ............... A61B 6/0414
250/370.15
2014/0078444 A1* 3/2014 Tsuchida ........... G02F 1/133528
349/58

FOREIGN PATENT DOCUMENTS

JP         62-201492 A    9/1987
JP         H03-144691 A   6/1991
(Continued)

OTHER PUBLICATIONS

Extended European Search Report issued in corresponding European Patent Application No. 15746753.1, dated Jun. 29, 2017.
(Continued)

*Primary Examiner* — Jinhee Lee
*Assistant Examiner* — Ingrid Wright
(74) *Attorney, Agent, or Firm* — McDermott Will & Emery LLP (57) ABSTRACT

The present invention addresses the problem of providing a display device that excels in waterproofness against moisture from a display side. A display device is provided with: a display for displaying an image on a display surface; a cover plate located on the display surface side of the display, the cover plate having a light-transmitting section for making the display surface visible; an elastic member provided so as to cover the side circumferential section of the cover plate; and an accommodation body having an open section that is open toward the cover plate side and a protruding section encircling the open section and protruding to the outer circumferential side of the open section. The display is bonded to the cover plate with a photocurable adhesive. The cover plate is secured via the elastic member to the protruding section by a caulked metal frame body.

6 Claims, 6 Drawing Sheets

(52) U.S. Cl.
CPC ............ *G02F 2001/133311* (2013.01); *G02F 2001/133331* (2013.01); *G02F 2201/46* (2013.01); *G02F 2202/28* (2013.01)

(58) Field of Classification Search
CPC ........ G02F 2001/133311; G02F 2001/133314; G02F 2001/13332; G02F 2201/46; G02F 2001/133331; G06F 1/1601; G06F 1/1616; G06F 1/1637; F16M 11/10
USPC ............ 361/679.02, 679.21, 679.26, 679.27, 361/679.09, 679.55, 679.22; 349/58–60
See application file for complete search history.

(56) References Cited

FOREIGN PATENT DOCUMENTS

| | | |
|---|---|---|
| JP | 3-94516 U | 9/1991 |
| JP | 2004-219476 A | 8/2004 |
| JP | 2009-025833 A | 2/2009 |
| WO | 2012/115140 A1 | 8/2012 |

OTHER PUBLICATIONS

International Search Report issued in International Application No. PCT/JP2015/051178, dated Apr. 14, 2015, with English Translation.

\* cited by examiner

DISPLAY DEVICE

RELATED APPLICATIONS

This application is the U.S. National Phase under 35 U.S.C. § 371 of International Application No. PCT/JP2015/051178, filed on Jan. 19, 2015, which in turn claims the benefit of Japanese Application No. 2014-021506, filed on Feb. 6, 2014, the disclosures of which Applications are incorporated by reference herein.

TECHNICAL FIELD

The present invention relates to a display device.

BACKGROUND ART

A related art display device is disclosed in, for example, Patent Literature 1. The display device related to Patent Literature 1 has a structure in which a transparent cover plate and a liquid crystal display device are bonded by a photocurable adhesive. With this structure in which an air layer between the cover plate and the liquid crystal display device is filled with the photocurable adhesive, reflection on an air layer interface can be reduced as much as possible and display quality can be kept high.

CITATION LIST

Patent Literature

Patent Literature 1: JP-A-2009-25833

SUMMARY OF THE INVENTION

Problems to be Solved by the Invention

In the display device of the structure in which the cover plate and the display are bonded by a photocurable adhesive as in Patent Literature 1, waterproofness must be considered depending on usage conditions. For example, especially if such a display device is for outdoor use, it is necessary to improve waterproofness especially from the display side.

The present invention is made in view of the circumstance described above, and an object thereof is to provide a display device with high waterproofness from a display side.

Solution to Problem

In order to achieve the above described object, a display device according to a present invention includes:

a display for displaying an image on a display surface;

a cover plate located on the display surface side of the display, the cover plate having a light-transmitting portion for making the display surface visible;

an elastic member provided so as to cover the side circumferential portion of the cover plate; and an accommodation body which is located further toward the display side than the cover plate and accommodates the display, the accommodation body having an opening that opens toward the cover plate side and a protruding portion surrounding the opening and protruding to the outer circumferential side of the opening, wherein the display is bonded to the cover plate by a photocurable adhesive, and wherein the cover plate is fixed via the elastic member to the protruding portion by a caulked metal frame body.

Effect of the Invention

According to the present invention, it is possible to provide a display device with high waterproofness from a display side.

BRIEF DESCRIPTION OF THE DRAWINGS

FIG. 3 is an exploded view of the display device illustrated in FIG. 2, wherein FIG. 3(a) illustrates a frame body and FIG. 3(b) illustrates a display unit.

FIG. 4 is an exploded view of the display device illustrated in FIG. 2, wherein FIG. 4(a) illustrates a circuit substrate unit and FIG. 4(b) illustrates an accommodation body.

MODE FOR CARRYING OUT THE INVENTION

An embodiment of the present invention will be described with reference to the drawings.

Figure 1:
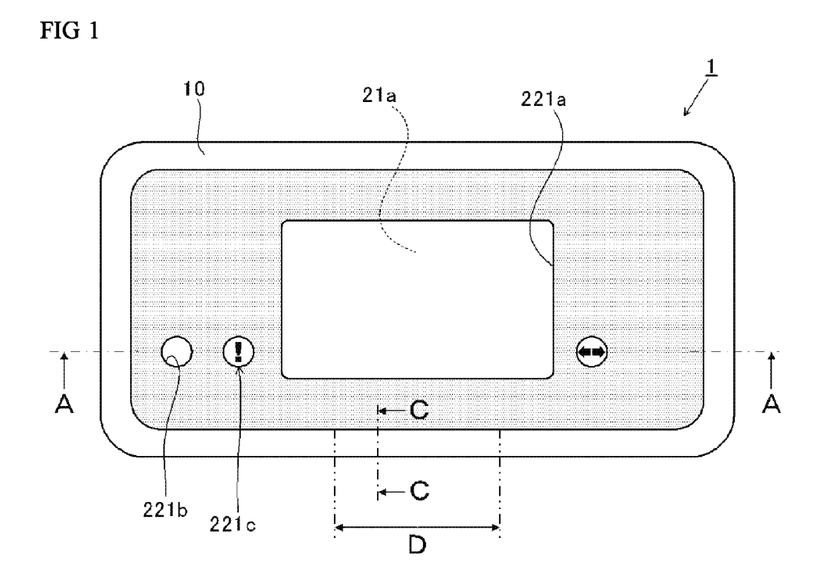
FIG. 1 is a schematic plan view of a display device according to an embodiment of the present invention.

A display device 1 according to the present embodiment has an outer shape as illustrated in FIG. 1, mounted on a vehicle (e.g., a motorcycle), and is configured as an instrument device that displays a predetermined measuring quantity (e.g., a vehicle speed). Hereafter, for the ease of understanding of the configuration of the display device 1, regarding each member, each member is described suitably with the display side of the display device 1 being "front" and the opposite side being "back" (refer to the double-sided arrow of FIG. 2).

Figure 2:
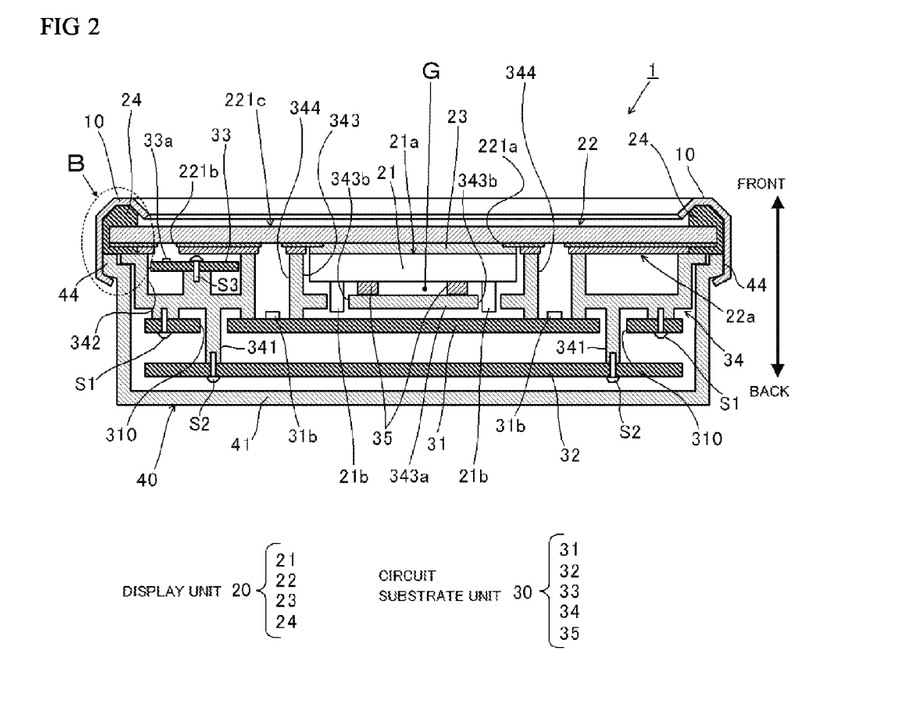
FIG. 2 is a cross-sectional view along line A-A of the display device illustrated in FIG. 1.

The display device 1 includes a frame body 10, a display unit 20, a circuit substrate unit 30, and an accommodation body 40 as illustrated in FIG. 2.

The frame body 10 is made of metal and, as illustrated in FIG. 2, the display unit 20 is fixed to the accommodation body 40. The fixing conditions will be described later.

(Display Unit 20)

Figure 3:
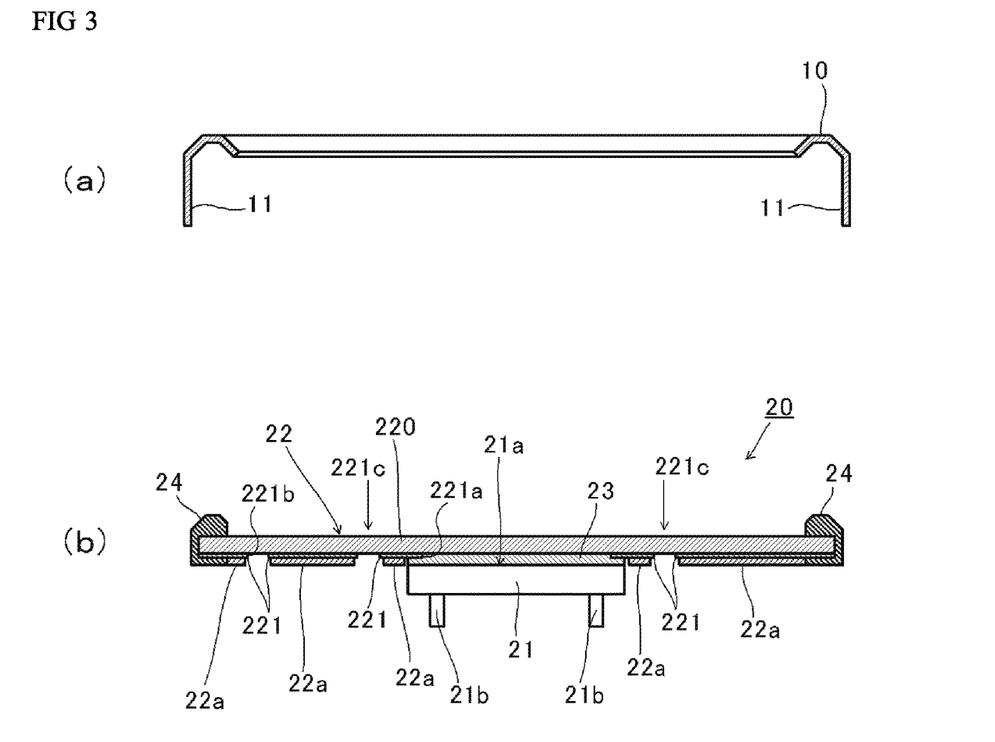

The display unit 20 includes a display 21, a cover plate 22, a light-transmitting layer 23, and an elastic member 24 as illustrated in FIGS. 2 and 3(b).

The display 21 consists, for example, of a thin film transistor (TFT) type liquid crystal display (LCD), and displays an image for notifying a predetermined measuring quantity (e.g., a vehicle speed) on a display surface 21a. In the present embodiment, a general-purpose modularized liquid crystal display is employed as the display 21, and the display 21 has boss bodies 21b protruding toward the back side (FIGS. 2 and 3(b)). The display 21 may be an organic electro-luminescence display (OELD) or the like.

The cover plate 22 is located on the front side of the display 21 and has a transparent plate 220 and a light-shielding portion 221.

The transparent plate 220 consists, for example, of inorganic glass or resin, and is formed in a transparent (including colored transparent) plate shape. The light-shielding portion 221 consists, for example, of a light-shielding printed layer formed on the back surface of the transparent plate 220. On the back surface of the transparent plate 220, there are portions where no light-shielding portion 221 is formed. These portions form a window portion 221a which makes the display surface 21a of the display 21 visible, and a window portion for temperature measurement 221b which faces a later-described thermistor 33a in the front and back direction. An alert display portion 221c consisting, for example, of an icon or a character for notifying predetermined alert information in the shape of an outline character is formed in a part of the light-shielding portion 221. That is, the alert display portion 221c partly has light-transmitting property. As illustrated in FIG. 1, the window portion 221a is formed in a rectangular shape, and the alert display portions 221c are located on both sides of the window portion 221a. The window portion for temperature measurement 221b is located adjacent to the alert display portion 221c disposed on the left side in FIG. 1.

A buffer member 22a is attached to the back surface side of the light-shielding portion 221 of the cover plate 22 by, for example, adhesion. The buffer member 22a consists, for example, of a spongy member or resin rubber, and abuts against a front side end portion of the case body 34. The buffer member 22a and a later-described elastic member 24 make the cover plate 22 not abut against the case body 34 as much as possible. With this configuration, application of vibration to an internal structure of the display device 1 is reduced, and distortion caused when the display unit 20 is fixed to the accommodation body 40 by the frame body 10 is reduced.

The light-transmitting layer 23 is filled between a back surface of the cover plate 22 and the display surface 21a of the display 21, and consists of a cured photocurable adhesive (e.g., ultraviolet light (UV)-curing adhesive). The cover plate 22 and the display 21 are bonded in a manner in which the cover plate 22 and the display 21 are stacked with the photocurable adhesive disposed therebetween, and are irradiated with light to cure the adhesive (what is called optical bonding).

As illustrated in FIGS. 2 and 3(b), the elastic member 24 is provided to cover a side circumferential portion of the cover plate 22. Focusing on the cross-sectional shape, the elastic member 24 has a substantially U-shape, and is disposed to hold an end portion (right and left end portions in FIGS. 2 and 3(b)) of the cover plate 22. The elastic member 24 is disposed between the cover plate 22 and the frame body 10 and between the cover plate 22 and the accommodation body 40, and functions as waterproof packing that prevents water (e.g., rain water) from entering from the outside of the display device 1.

(Circuit Substrate Unit 30)

Figure 4:
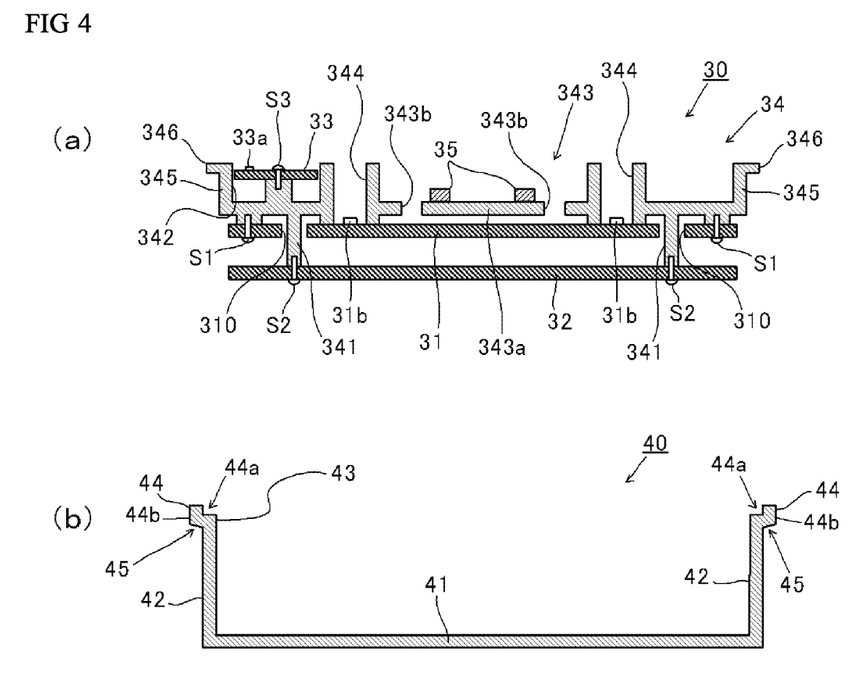

The circuit substrate unit 30 includes a first circuit substrate 31, a second circuit substrate 32, a third circuit substrate 33, a case body 34 holding these circuit substrates, and a buffer member 35 as illustrated in FIGS. 2 and 4(a).

Each of the first to the third circuit substrates 31 to 33 consists of a printed circuit board in which various electronic components are mounted on a substrate with printed wiring formed thereon.

Figure 6:
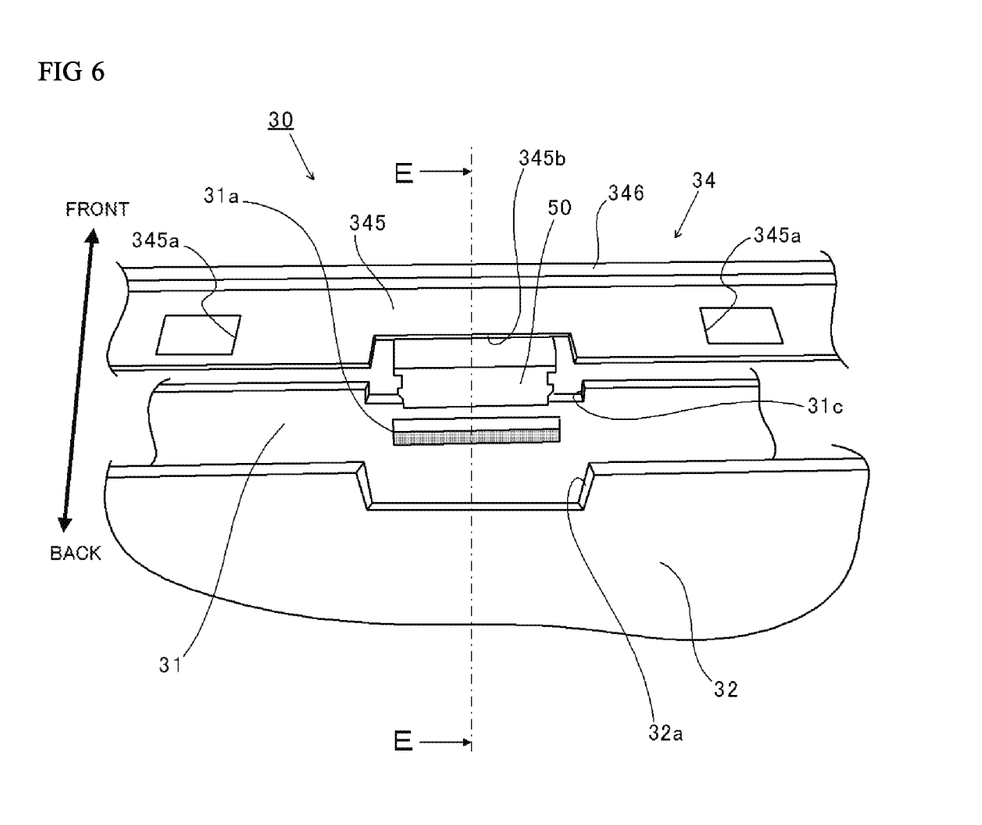
FIG. 6 is a schematic perspective view of the circuit substrate unit.

The first circuit substrate 31 is located on the back side of the display 21 and is connected electrically with the display 21. Specifically, as illustrated in FIG. 6, a connector 31a is mounted on the back surface of the substrate of the first circuit substrate 31, and the first circuit substrate 31 and the display 21 are connected electrically by the connector 31a and a flexible substrate 50 connected to a connector 21c (refer to FIG. 7) provided on the back surface side of the display 21. The flexible substrate 50 consists, for example, of a flexible printed circuit (FPC) or a flexible flat cable (FFC). For example, the connector 21c is located on an upper end portion side in FIG. 1 of the display 21. FIG. 6 illustrates a state before the flexible substrate 50 is connected to the connector 31a.

As illustrated in FIG. 2, a light source 31b which illuminates the alert display portion 221c is mounted on the front side of the first circuit substrate 31. The light source 31b consists, for example, of light emitting diode (LED), is provided at a position facing the alert display portion 221c in the front and back direction of the display device 1, and emits light toward the front side.

A control unit (e.g., an unillustrated microcomputer) which controls operations of the display device 1 is mounted on the first circuit substrate 31 (e.g., mounted on the back side of the substrate). The control unit is connected electrically with an electronic control unit (ECU) (not illustrated) of the vehicle, and displays an image indicating vehicle speed and the like on the display 21 in accordance with various types of information about the vehicle acquired from the ECU. For example, the light source 31b emits light under the control of the control unit.

The second circuit substrate 32 is located on the back side of the first circuit substrate 31 and is connected electrically with the first circuit substrate 31. Specifically, a connector (not illustrated) mounted on the back side of the first circuit substrate 31 and a connector (not illustrated) mounted on the front side of the second circuit substrate 32 are connected to thereby connect the first circuit substrate 31 and the second circuit substrate 32 electrically.

Besides various electronic components, a connector for external connection (not illustrated) which is exposed to the back side of the accommodation body 40 for connecting the display device 1 externally is mounted on the second circuit substrate 32. The connector for external connection is mounted on the back side of the second circuit substrate 32, and is exposed to the outside of the display device 1 from an opening (not illustrated) provided in a bottom portion 41 of the accommodation body 40 (FIGS. 2 and 4(b)). With the connector for external connection, the display device 1 is connectable with the external device, such as the ECU.

As illustrated in FIGS. 2 and 4(a), the third circuit substrate 33 is located on the front side of the first circuit substrate 31 and is located further toward an end portion side (the left end side in FIG. 2) of the display device 1 than the display 21. The third circuit substrate 33 is connected electrically with the first circuit substrate 31 by a connection means, such as a cable.

Besides various electronic components, the thermistor 33a is mounted on the front side of the third circuit substrate 33. The thermistor 33a is provided at a location facing the window portion for temperature measurement 221b in the front and back direction of the display device 1, and outputs a resistance value (a signal) which varies depending on the change in the ambient temperature of the display device 1. The window portion for temperature measurement 221b has light-transmitting property because it is formed at a portion where no light-shielding portion 221 is provided in the cover plate 22. Therefore, a temperature change caused by the external light passed through the window portion for temperature measurement 221b reaches the thermistor 33a. For example, based on the resistance value output from the thermistor 33a, the above-described control unit displays the ambient air temperature of the display device 1 on the display 21 or, if it is determined that the ambient air temperature has become higher than a predetermined threshold value, display luminance of the display 21 is lowered to avoid damage to the display 21 and the like due to a temperature rise.

The case body 34 is formed as an opaque (e.g., white) body from resin, such as polypropylene, and holds the first to the third circuit substrates 31 to 33.

Specifically, the first circuit substrate 31 is fixed to the case body 34 by a fixing means, such as a screw S1, from the back side as illustrated in FIG. 2. The second circuit substrate 32 is formed in the case body 34, and is fixed to the case body 34 by a fixing means, such as a screw S2, at a boss portion 341 protruding toward the back side. The boss portion 341 passes through an opening 310 formed in the substrate of the first circuit substrate 31 and reaches from the front side to the back side of the first circuit substrate 31. The second circuit substrate 32 fixed to such a boss portion 341 is located on the back side of the first circuit substrate 31. The third circuit substrate 33 is located in a recessed accommodation space 342 provided on the back side of the window portion for temperature measurement 221b, and is fixed to the case body 34 by a fixing means, such as a screw S3, from the front side. The first to the third circuit substrates 31 to 33 are thus fixed to (held by) the case body 34.

As illustrated in FIGS. 2 and 4(a), the case body 34 has a recessed portion 343 in which the display 21 is accommodated, and a light guide 344 which guides light emitted from the light source 31b to the cover plate 22.

As illustrated in FIG. 2, the recessed portion 343 is formed as a recess, covers the display 21 from the back side, and accommodates the display 21 so as to substantially surround the portions other than the display surface 21a. A gap portion G (refer to FIG. 2) is formed between the display 21 and the recessed portion 343 in the normal direction of the display surface 21a, whereby the display 21 and the recessed portion 343 do not abut against each other. Therefore, the display 21 is supported by the cover plate 22 in a suspended manner via the light-transmitting layer 23.

A through hole 343b through which the boss body 21b of the display 21 passes to the first circuit substrate 31 side is formed in the bottom portion 343a of the recessed portion 343. For example, an opening diameter of the through hole 343b is larger than the diameter of the boss body 21b, and, therefore, the case body 34 and the boss body 21b do not abut against each other. Since the through hole 343b for guiding out the boss body 21b is formed in the recessed portion 343, the display 21 is accommodated in a space as small as possible, and the degree of freedom in design is kept.

As illustrated in FIG. 2, the light guide 344 is a tubular portion formed adjacent to the recessed portion 343 and guides light emitted from the light source 31b toward the cover plate 22. For example, the light guide 344 is formed to surround a line that connects the light source 31b and the alert display portion 221c located on the front side of the light source 31b. The light emitted from the light source 31b reaches the cover plate 22 while being efficiently reflected by an inner surface of the thus-formed light guide 344, and illuminates the alert display portion 221c.

The case body 34 has a side wall portion 345 and a flange portion 346.

The side wall portion 345 is a wall portion standing from the bottom portion 343a toward the front side, and having a surface directed toward an outer circumferential side of the case body 34 as illustrated in FIGS. 4(a), 6 and other drawings. As illustrated in FIG. 6, a plurality of radiating holes 345a for radiating heat generated from the display 21 and the like during operation are formed in the side wall portion 345.

Figure 7:
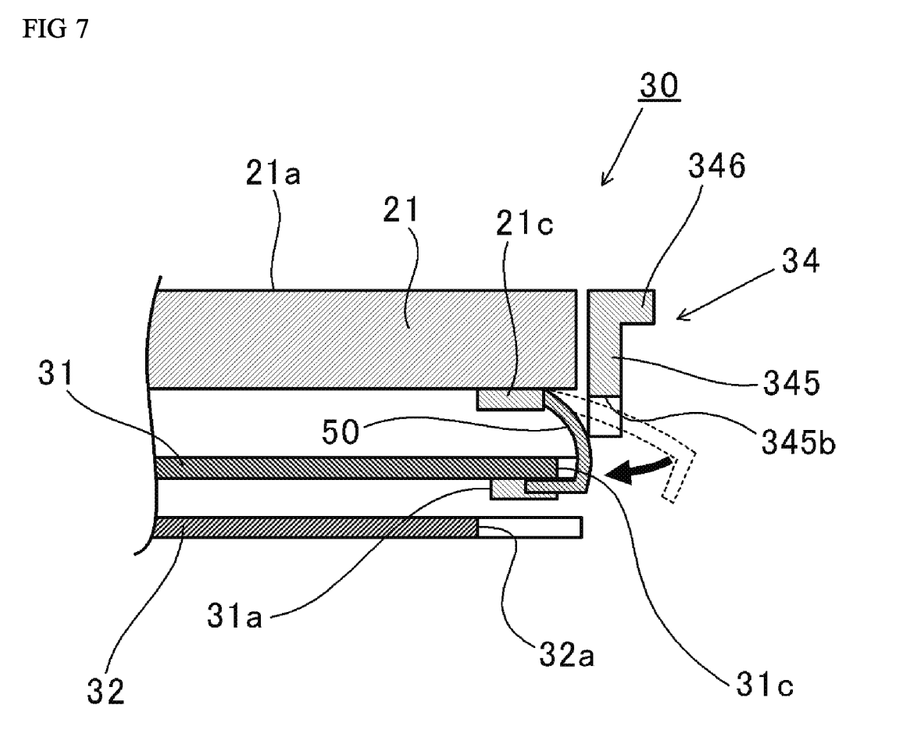
FIG. 7 is a cross-sectional view along line E-E of the circuit substrate unit illustrated in FIG. 6.

As illustrated in FIGS. 6 and 7, a guide out portion 345b consisting of a cut out through which the flexible substrate 50 connected with the connector 21c of the display 21 passes is formed in the side wall portion 345. As described above, the connector 21c is mounted on the back side of the display 21 and on the upper end portion side in FIG. 1. Since the flexible substrate 50 connected to the connector 21c is connected with the connector 31a mounted on the back side of the first circuit substrate 31 (mounted on the back side of the first circuit substrate 31 and on the upper end portion side in FIG. 1), the display 21 and the first circuit substrate 31 are connected electrically. The guide out portion 345b is provided in order to facilitate the connecting operation of the flexible substrate 50 to the connector 31a, and in order to prevent load by friction or the like from being applied to the flexible substrate 50 when the flexible substrate 50 unnecessarily abuts against the case body 34.

From the same reason, a first notch portion 31c is formed on the upper end portion side of the first circuit substrate 31 in FIG. 1 and a second notch portion 32a is formed on the upper end portion side of the second circuit substrate 32 in FIG. 1 (refer to FIGS. 6 and 7). Especially, as illustrated in FIG. 7, the second notch portion 32a formed in the second circuit substrate 32 is formed at a portion facing the connector 31a mounted on the first circuit substrate 31 in the front and back direction (in the normal direction of the display surface 21a), thereby facilitating the connection of the flexible substrate 50 to the connector 31a.

The flange portion 346 is a portion formed to protrude toward the outer circumferential side of the case body 34 from a front side end portion of the side wall portion 345, and is fit in a later-described step portion 44a formed in the accommodation body 40. Therefore, the case body 34 is disposed to be placed in the accommodation body 40 from the front side.

The buffer member 35 consists of a spongy member, resin rubber, and the like and is attached to the front side of the bottom portion 343a of the recessed portion 343 by, for example, bonding. That is, the buffer member 35 is provided in a gap portion G. The buffer member 35 has a height (the height in the front and back direction) which is substantially the same (including exactly the same) as a distance between the back surface of the display 21 and the bottom portion 343a of the recessed portion 343, or has a height with which the buffer member 35 touches the display 21 when the display 21 inclines from the horizontal state due to, for example, vibration. The buffer member 35 is provided in order to alleviate an impact applied to the display 21 during, for example, vibration.

The accommodation body 40 is made of resin, such as acrylonitrile butadiene styrene copolymer (ABS) and has light-shielding property (e.g., black-colored).

The accommodation body 40 has the bottom portion 41 described above and a wall portion 42 standing toward the front side from an end portion of the bottom portion 41, and is formed in a box shape opening to the front side. That is, the accommodation body 40 has an opening 43 surrounded by a front side end portion of the wall portion 42. The circuit substrate unit 30 is disposed inside the thus formed accommodation body 40.

A protruding portion 44 protruding toward an outer circumferential side of the opening 43 is provided at the front side end portion of the wall portion 42. The step portion 44a surrounding the opening 43 is formed on the opening 43 side of the protruding portion 44. The case body 34 is disposed in the accommodation body 40 with the flange portion 346 of the case body 34 described above fit in the step portion 44a. That is, the circuit substrate unit 30 is thus disposed inside of the accommodation body 40.

Hereinafter, a method for assembling the display device 1, and a detailed configuration which is not described will be described.

Here, regarding the order of assembly, an example in which the frame body 10 is turned over from the state illustrated in FIG. 3(a) and the display unit 20, the circuit substrate unit 30, and the accommodation body 40 are assembled in a stacked manner in this order is described.

First, the display unit 20 illustrated in FIG. 3(b) is disposed on the frame body 10 which has been turned over from the state illustrated in FIG. 3(a). At this time, the frame body 10 is in contact only with the elastic member 24 in the display unit 20. As illustrated in FIGS. 3(a) and 3(b), the frame body 10 is formed to conform the shape of the elastic member 24 provided in the side circumferential portion of the cover plate 22. Specifically, the frame body 10 covers the front side and the side portion side of the elastic member 24. The flexible substrate 50 is connected to the display 21 of the display unit 20 in advance.

Next, the circuit substrate unit 30 illustrated in FIG. 4(a) is placed from the side of the display 21 of the display unit 20. At this time, as illustrated in FIG. 6, the flexible substrate 50 is guided out from the guide out portion 345b formed in the case body 34 of the circuit substrate unit 30. As illustrated in FIG. 7, the flexible substrate 50 is connected to the connector 31a mounted on the back side of the first circuit substrate 31. The connecting operation is facilitated especially with the second notch portion 32a being provided in the second circuit substrate 32.

As described above, in a state where the circuit substrate unit 30 is placed in the display unit 20, the flange portion 346 of the case body 34 of the circuit substrate unit 30 abuts against the elastic member 24 which covers the side circumferential portion of the cover plate 22, and the front side end portion of the case body 34 other than the flange portion 346 abuts against the buffer member 22a, whereby the case body 34 and the cover plate 22 are not in contact with each other directly.

Subsequently, from the opening 43 side, the accommodation body 40 illustrated in FIG. 4(b) is placed to cover the circuit substrate unit 30. Specifically, the flange portion 346 formed in the case body 34 is placed to fit into the step portion 44a formed in the accommodation body 40.

Figure 5:
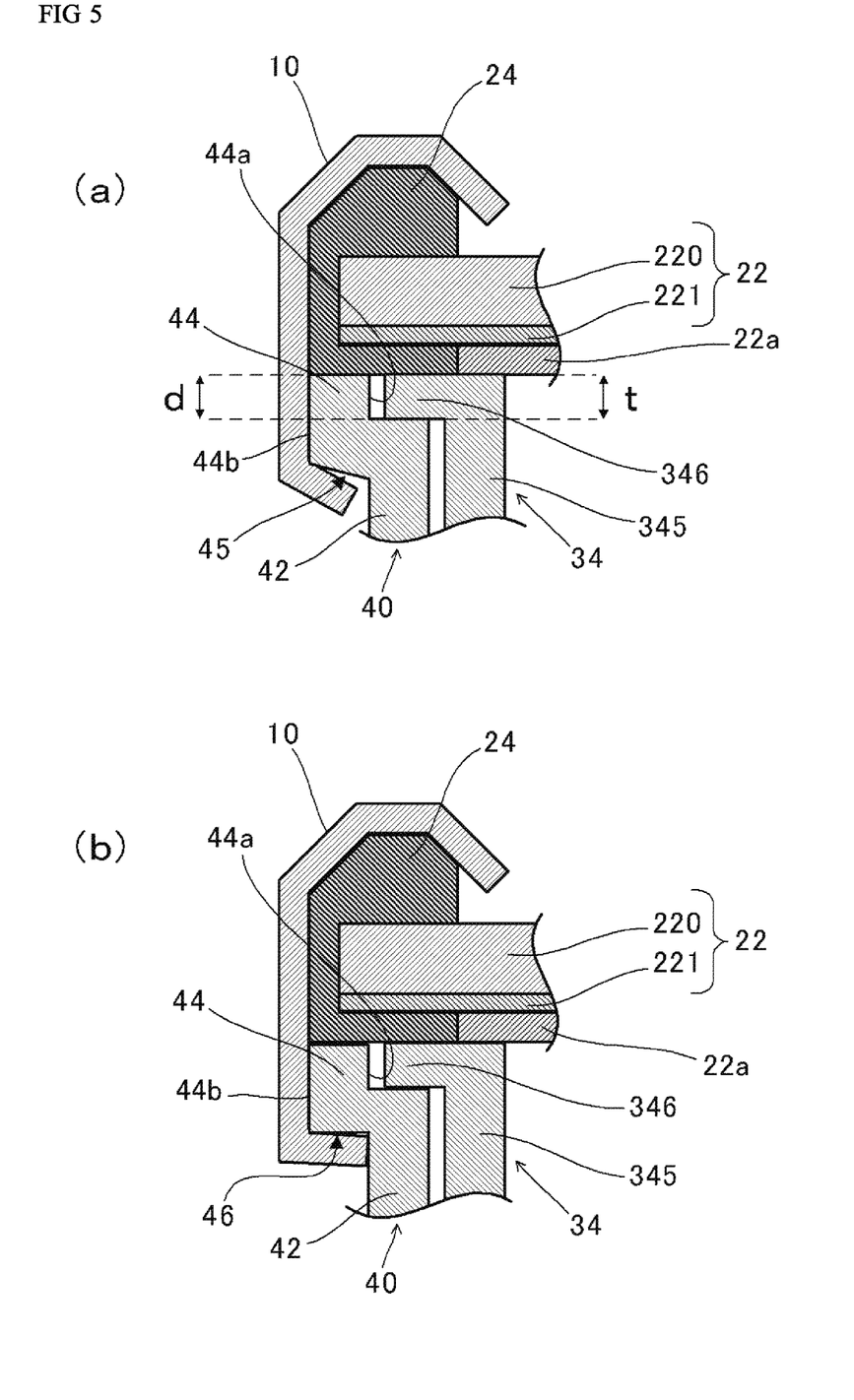
FIG. 5(a) is an enlarged view in the vicinity of a section B of the display device illustrated in FIG. 2.
FIG. 5(b) is a cross-sectional view along line C-C of the display device illustrated in FIG. 1.

Here, as illustrated in FIG. 5(a), the depth d of the step portion 44a and the thickness t of the flange portion 346 are set to be substantially equal. Therefore, the protruding portion 44 and the flange portion 346 are located on substantially the same plane on the cover plate 22 side, and constitute a mounting surface on which the elastic member 24 is placed. Since the mounting surface is thus configured, the elastic member 24 and the cover plate 22 are disposed stably, and the elastic member 24 is located between the protruding portion 44 (or the step portion 44a) and the flange portion 346, whereby entering of water inside of the apparatus can be prevented favorably.

After stacking each unit as described above, the metallic frame body 10 is caulked and is fixed to the protruding portion 44 of the accommodation body 40, whereby the display device 1 is assembled. However, before caulking and fixing of the frame body 10, the cover plate 22 is not positioned about the in-plane direction of the display surface 21a (the direction parallel to the display surface 21a), but is positioned mainly about the out-of-plane direction (the normal direction of the display surface 21a).

Specifically, as illustrated in FIGS. 5(a) and 5(b), in a state where the case body 34 is disposed in the accommodation body 40, some clearance for enabling attachment and removal of the case body 34 to and from the accommodation body 40 is provided between the step portion 44a of the accommodation body 40 and the flange portion 346 of the case body 34. That is, the flange portion 346 is not fit tightly in the step portion 44a. Before caulking and fixing of the frame body 10, the case body 34 is disposed in the accommodation body 40 with some play in the in-plane direction of the display surface 21a. That is, before the fixation by the frame body 10, the cover plate 22 (or the display unit 20) placed in the case body 34 is also disposed with some play in the in-plane direction of the display surface 21a.

FIG. 3(a) illustrates the state before the frame body 10 is caulked. When the frame body 10 is caulked and fixed, a back side end portion of a stand wall portion 11 of the frame body 10 which stands to surround the side circumferential portion of the elastic member 24 is bent inward at the protruding portion 44 of the accommodation body 40 as a fulcrum.

Specifically, as illustrated in FIGS. 4(b) and 5(a), an inclined portion 45 not perpendicularly crossing the normal direction of the display surface 21a but inclined is formed on the back side of the protruding portion 44. The inclined portion 45 is a portion which connects the wall portion 42 standing substantially along the normal direction of the display surface 21a from the bottom portion 41 of the accommodation body 40 and a side top portion 44b, of the protruding portion 44, which faces the stand wall portion 11 of the frame body 10. The frame body 10 is bent at a corner formed by the side top portion 44b and the inclined portion 45 as a fulcrum, and is caulked and fixed to the accommodation body 40.

As illustrated in FIG. 5(a), since the inclined portion 45 is thus provided, the portion at which the frame body 10 is bent by caulking and fixing is not right-angled. In this manner, stress concentration on a specified part of the frame body 10 can be avoided, and distortion that can be caused in the display device 1 when the frame body 10 is caulked or excessive distortion that can be caused in the frame body 10 itself can be reduced.

The inclined portion 45 is formed to substantially surround an outer periphery of the display device 1 illustrated in FIG. 1, but is not provided at a portion of the range D illustrated by the double-sided arrow. Here, a cross-sectional view along line D-D of FIG. 1 which is a cross-sectional view of the display device 1 in the range D is illustrated in FIG. 5(b).

In the range D illustrated in FIG. 1, as illustrated in FIG. 5(b), a horizontal portion 46 which crosses the normal direction of the display surface 21a perpendicularly and which is parallel with the horizontal direction is formed on the back side of the protruding portion 44. The horizontal portion 46 is, in the range D, a portion which connects the wall portion 42 standing substantially along the normal direction of the display surface 21a from the bottom portion 41 of the accommodation body 40 and the side top portion 44b, of the protruding portion 44, which faces the stand wall portion 11 of the frame body 10.

Since the horizontal portion 46 is thus provided, the portion at which the frame body 10 is bent by caulking and fixing in the range D becomes substantially right-angled as illustrated in FIG. 5(b) (the frame body 10 does not become completely right-angled due to its own restoring force).

In the display device 1, while the fixing structure by the frame body 10 becomes rigid by forming the horizontal portion 46 in a part of the protruding portion 44 of the accommodation body 40, excessive distortion of the frame body 10 and the like is reduced as described above by providing the inclined portion 45 to surround the display device 1 with the portion other than the horizontal portion 46 disposed along the outer periphery of the display device 1.

The display device 1 described above includes the display 21 for displaying an image on the display surface 21a, the cover plate 22 located on the display surface 21a side of the display 21, the cover plate 22 having a light-transmitting portion (the window portion 221a) for making the display surface 21a visible, the elastic member 24 provided so as to cover the side circumferential portion of the cover plate 22, and the accommodation body 40 which is located further toward the display 21 side than the cover plate 22 and accommodates the display 21, the accommodation body 40 having the opening 43 that opens toward the cover plate 22 side and the protruding portion 44 surrounding the opening 43 and protruding to the outer circumferential side of the opening 43. In the display device 1, the display 21 is bonded to the cover plate 22 by a photocurable adhesive (the light-transmitting layer 23) from the display surface 21a side, and the cover plate 22 is fixed to the protruding portion 44 via the elastic member 24 with the caulked metal frame body 10.

Since the cover plate 22 is thus fixed to the accommodation body 40 via the elastic member 24, entering of water between the cover plate 22 and the accommodation body 40 can be prevented. Therefore, the display device 1 has high waterproofness from the display surface 21a side (the display side).

The display device 1 includes the case body 34 located further toward the display 21 side than the cover plate 22 and accommodated in the accommodation body 40. A circuit substrate (the first circuit substrate 31) connected electrically with the display 21 is fixed to the case body 34 on the side opposite to the side of the cover plate 22. The case body 34 includes the recessed portion 343 which is recessed toward the circuit substrate side from the cover plate 22 side and accommodates the display 21.

As described above, an accommodation space can be provided between the display 21 and the first circuit substrate 31 in the accommodation body 40 by the case body 34 which accommodates the display 21 in the recessed portion 343 on the front side and fixes the first circuit substrate 31 on the back side. Therefore, it becomes easier to provide a space for disposing other parts (electronic components), and the degree of freedom in design becomes higher.

In the accommodation body 40, the step portion 44a surrounding the opening 43 is formed on the opening 43 side of the protruding portion 44, and the flange portion 346 which fits in the step portion 44a is formed in the case body 34.

With this configuration, it is easy to assemble the case body 34 to the accommodation body 40.

The depth d of the step portion 44a and the thickness t of the flange portion 346 are substantially equal (refer to FIG. 5(a)), and the protruding portion 44 and the flange portion 346 are located on substantially the same plane on the cover plate 22 side, and constitute a mounting surface on which the elastic member 24 is placed.

Since the mounting surface is thus configured, the elastic member 24 and the cover plate 22 are disposed stably, and the elastic member 24 is located between the protruding portion 44 (or the step portion 44a) and the flange portion 346, whereby entering of water inside of the apparatus can be prevented favorably.

The accommodation body 40 has the wall portion 42 standing along the normal direction of the display surface 21a. The protruding portion 44 is located at an end portion of the wall portion 42 on the cover plate 22 side and protrudes on the outer circumferential side of the opening 43 rather than the wall portion 42. The inclined portion 45 connected with the wall portion 42, not perpendicularly crossing the normal direction but inclined is provided in the protruding portion 44 on the side opposite to the side of the cover plate 22, and the frame body 10 is bent along the inclined portion 45 (refer to FIG. 5(a)).

With this configuration, as described above, distortion of the frame body 10 when caulked can be reduced as much as possible.

When seen from the display surface 21a side, the inclined portion 45 is provided to surround the opening 43 except for a part (the range D illustrated in FIG. 1). In that part (in the range D), the horizontal portion 46 which is connected with the wall portion 42 and crosses the normal direction substantially perpendicularly is provided in the protruding portion 44 on the side opposite to the side of the cover plate 22 (refer to FIG. 5(b)).

With this configuration, as described above, the cover plate 22 can be fixed to the accommodation body 40 firmly and stably while suppressing the distortion of the frame body 10 during caulking as much as possible.

The display device 1 further includes the third circuit substrate 33 (an exemplary substrate for a temperature sensor) on which the thermistor 33a (an exemplary temperature sensor) is mounted. The accommodation space 342 in which the third circuit substrate 33 is accommodated is formed between the recessed portion 343 and the flange portion 346 of the case body 34.

As described above, the space in the accommodation body 40 can be used effectively by further providing the accommodation space 342 in the case body 34 in which the recessed portion 343 for accommodating the display 21 is formed.

The display device 1 described above includes a display unit 20 provided with the display 21 for displaying an image on the display surface 21a, and the cover plate 22 bonded on the display surface 21a side of the display 21 by a photocurable adhesive (the light-transmitting layer 23), the cover plate 22 having a light-transmitting portion (the window portion 221a) for making the display surface 21a visible, a case body 34 which is located further toward the display 21 side than the cover plate 22, and has the recessed portion 343 recessed toward the opposite side of the cover plate 22 for accommodating the display 21, and the accommodation body 40 which is located further toward the display 21 side than the cover plate 22 and accommodates the display 21 and the case body 34. In the normal direction of the display surface 21a, the gap portion G (refer to FIG. 2) is formed between the display 21 and the recessed portion 343. The display 21 and the recessed portion 343 are not in contact with each other, and the display unit 20 is supported by a predetermined part of the case body 34 other than the recessed portion 343 (including supported via the elastic member 24 or the like).

As described above, since the display 21 is supported in a suspended manner by the cover plate 22 and is not in contact with the recessed portion 343, vibration caused to the display 21 can be reduced as much as possible upon, for example, the impact on the display 21. That is, the display device 1 has high resistance against vibration.

The buffer member 35 is provided in the gap portion G. With this configuration, the display 21 can be protected even if unexpected vibration is caused to the display device 1. The buffer member 35 desirably has a height (the height in the front and back direction) which is substantially the same (including exactly the same) as a distance between the back surface of the display 21 and the bottom portion 343a of the recessed portion 343 (the height of the gap portion G), or desirably has a height with which the buffer member 35 touches the display 21 when the display 21 inclines from the horizontal state due to, for example, vibration.

The display device 1 further includes the first circuit substrate 31 which is connected electrically with the display 21 and on which the light source 31b that illuminates the alert display portion 221c formed in the cover plate 22 is mounted, and the second circuit substrate 32 which is connected electrically with the first circuit substrate 31, and is located on the side of the first circuit substrate 31 opposite to the cover plate 22. The case body 34 supports the first circuit substrate 31 and the second circuit substrate 32 so that these substrates are stacked on the side opposite to the side of the cover plate 22.

Since the case body 34 supports the first circuit substrate 31 and the second circuit substrate 32 in a stacked manner in the normal direction of the display surface 21a (i.e., in the thickness direction of the display device 1), the display device 1 can be made compact.

The display unit 20 has the elastic member 24 provided to cover the side circumferential portion of the cover plate 22. The cover plate 22 is fixed to the protruding portion 44 via the elastic member 24 by the caulked metal frame body 10. The cover plate 22 is positioned in the normal direction of the display surface 21a by being placed in the flange portion 346 via the elastic member 24, and is positioned also in the direction crossing the normal direction perpendicularly by being fixed to the protruding portion 44 via the elastic member 24 by the frame body 10.

As described above, since the cover plate 22 has a degree of freedom to some extent in the in-plane direction of the display surface 21a before the fixation of the cover plate 22 to the accommodation body 40 by the frame body 10, distortion of the display device 1 that can be caused during caulking of the frame body 10 can be reduced as much as possible.

Further, the display 21 and the first circuit substrate 31 are connected electrically by the flexible substrate 50, and the guide out portion 345b consisting of a cut out through which the flexible substrate 50 passes is formed in the side wall portion 345 standing along the normal direction of the display surface 21a of the recessed portion 343 which accommodates the display 21.

With this configuration, assembly is easy as described above.

The connector 31a connected with the flexible substrate 50 is mounted on the first circuit substrate 31 of the second circuit substrate 32 side and, the notch portion 32a is formed in the portion which faces the connector 31a in the normal direction of the display surface 21a in the second circuit substrate 32.

With this configuration, assembly is easy as described above.

The present invention is not limited by the above-described embodiment and the drawings. Modification (including deletion of components) can be made suitably without changing the scope of the present invention.

In the above description, for the ease of understanding of the present invention, description of publicly known technical matters that are not important is omitted as necessary.

INDUSTRIAL APPLICABILITY

Although an example in which the invention is applied to the display device of a vehicle is described, the invention is not limited to the same. The invention can also be applied to a display device for ships, or a display device of special vehicles, such as agricultural machines and construction machines, and so on.

DESCRIPTION OF REFERENCE NUMERALS

1 . . . Display device
10 . . . Frame body
20 . . . Display unit
21 . . . Display
21a . . . Display surface
21b . . . Boss body
21c . . . Connector
22 . . . Cover plate
22a . . . Buffer member
220 . . . Transparent plate
221 . . . Light-shielding portion
221a . . . Window portion
221b . . . Window portion for temperature measurement
221c . . . Alert display portion
23 . . . Light-transmitting layer (photocurable adhesive)
24 . . . Elastic member
30 . . . Circuit substrate unit
31 . . . First circuit substrate
31a . . . Connector
31b . . . Light source
31c . . . First notch portion
310 . . . Opening
32 . . . Second circuit substrate
32a . . . Second notch portion
33 . . . Third circuit substrate
33a . . . Thermistor
34 . . . Case body
341 . . . Boss portion
342 . . . Accommodation space
343 . . . Recessed portion
343a . . . Bottom portion
343b . . . Through hole
344 . . . Light guide
345 . . . Side wall portion
345a . . . Radiating hole
345b . . . Guide out portion
346 . . . Flange portion
35 . . . Buffer member
40 . . . Accommodation body
41 . . . Bottom portion
42 . . . Wall portion
43 . . . Opening
44 . . . Protruding portion
44a . . . Step portion
44b . . . Side top portion
45 . . . Inclined portion
46 . . . Horizontal portion
50 . . . Flexible substrate

The invention claimed is:
1. A display device comprising:
a display for displaying an image on a display surface;

a cover plate located on a display surface side of the display, the cover plate having a light-transmitting portion for making the display surface visible;

an elastic member provided so as to cover a side circumferential portion of the cover plate; and an accommodation body which is located further toward a display side than the cover plate and accommodates the display, the accommodation body having an opening that opens toward a cover plate side and a protruding portion surrounding the opening and protruding to an outer circumferential side of the opening, wherein the display is bonded to the cover plate by a photocurable adhesive, wherein the cover plate is fixed via the elastic member to the protruding portion by a caulked metal frame body, wherein the accommodation body has a wall portion standing along a normal direction of the display surface, the protruding portion is located at an end portion of the wall portion on the cover plate side and protrudes on the outer circumferential side of the opening rather than the wall portion, an inclined portion connected with the wall portion, not perpendicularly crossing the normal direction but inclined is provided in the protruding portion on a side opposite to a side of the cover plate, and the frame body is bent along the inclined portion.

2. The display apparatus according to claim 1, further comprising a case body which is located further toward the display side than the cover plate and is accommodated in the accommodation body, wherein a circuit substrate connected electrically with the display is fixed to the case body on the side opposite to the side of the cover plate, and the case body has a recessed portion which is recessed toward a circuit substrate side from the cover plate side and accommodates the display.

3. The display apparatus according to claim 2, wherein a step portion surrounding the opening is formed in the accommodation body on an opening side of the protruding portion, and a flange portion which fits in the step portion is formed in the case body.

4. The display apparatus according to claim 3, wherein a depth of the step portion and a thickness of the flange portion are substantially equal and, when the flange portion fits in the step portion, the protruding portion and the flange portion are located on substantially the same plane on the cover plate side and constitute a mounting surface on which the elastic member is placed.

5. The display device according to claim 3, further comprising a substrate for a temperature sensor on which a temperature sensor is mounted, wherein an accommodation space for accommodating the substrate for the temperature sensor is formed between the recessed portion and the flange portion of the case body.

6. The display apparatus according to claim 1, wherein when seen from the display surface side, the inclined portion is provided to surround the opening except for a part, and in that part, a horizontal portion connecting with the wall portion and crossing the normal direction substantially perpendicularly is provided in the protruding portion on the side opposite to the side of the cover plate.

* * * * *